(12) United States Patent
Degawa et al.

(10) Patent No.: US 10,131,090 B2
(45) Date of Patent: Nov. 20, 2018

(54) ADHESIVE SHEET PASTING METHOD AND ADHESIVE SHEET PASTING APPARATUS (71) Applicant: NITTO DENKO CORPORATION, Ibaraki-shi, Osaka (JP)

(72) Inventors: Osamu Degawa, Ibaraki (JP); Masakazu Kato, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/126,788

(22) PCT Filed: Mar. 18, 2015

(86) PCT No.: PCT/JP2015/058085
§ 371 (c)(1),
(2) Date: Sep. 16, 2016

(87) PCT Pub. No.: WO2015/141736
PCT Pub. Date: Sep. 24, 2015

(65) Prior Publication Data
US 2017/0095969 A1 Apr. 6, 2017

(30) Foreign Application Priority Data
Mar. 19, 2014 (JP) .................. 2014-056587

(51) Int. Cl.
B29C 65/50 (2006.01)
B29C 63/00 (2006.01)
(Continued)

(52) U.S. Cl.
CPC .......... *B29C 65/50* (2013.01); *B29C 63/0073* (2013.01); *B29C 63/02* (2013.01);
(Continued)

(58) Field of Classification Search
CPC .............. B29C 65/50; B29C 66/74283; B29C 66/8362; B29C 66/922; B29C 66/9241;
(Continued)

(56) References Cited

U.S. PATENT DOCUMENTS

| 3,607,533 A | 9/1971 | Moore |
| 2005/0103422 A1 | 5/2005 | Kawaguchi |
| 2007/0261366 A1 | 11/2007 | Iwamoto et al. |

FOREIGN PATENT DOCUMENTS

| JP | 60-72238 U | 5/1985 |
| JP | 61-127426 A | 6/1986 |

(Continued)

OTHER PUBLICATIONS

English translation of JP2007246099.*
(Continued)

*Primary Examiner* — Sonya M Sengupta
(74) *Attorney, Agent, or Firm* — Sughrue Mion, PLLC (57) ABSTRACT A pasting roller has brush bristles planted in a surface thereof in straight lines or spirally to form a plurality of rows at predetermined intervals on the roller surface. An adhesive sheet S is pasted to work while moving the pasting roller and the work, which is the recipient, relative to and crossing each other. In this pasting process, a rotating speed of the pasting roller is adjusted according to a surface configuration of the work to render the pressure on the adhesive sheet constant.

5 Claims, 7 Drawing Sheets (51) Int. Cl.
    *B29C 65/00*        (2006.01)
    *B32B 27/06*        (2006.01)
    *B29C 63/02*        (2006.01)
    *B29K 705/12*       (2006.01)
    *B29L 31/30*        (2006.01)

(52) U.S. Cl.
    CPC .... *B29C 66/74283* (2013.01); *B29C 66/8362* (2013.01); *B29C 66/922* (2013.01); *B29C 66/9241* (2013.01); *B32B 27/06* (2013.01); *B29C 66/83411* (2013.01); *B29K 2705/12* (2013.01); *B29L 2031/3002* (2013.01); *B29L 2031/3055* (2013.01); *Y10T 156/1788* (2015.01)

(58) Field of Classification Search
    CPC .......... B29C 66/83411; B29K 2705/12; B32B 27/06; Y10T 156/1788; B65H 37/007
    USPC .................................. 156/295, 574, 581, 582
    See application file for complete search history.

(56) References Cited

FOREIGN PATENT DOCUMENTS

| | | |
|---|---|---|
| JP | 8-85195 A | 4/1996 |
| JP | 2001-10618 A | 1/2001 |
| JP | 2002-362797 A | 12/2002 |
| JP | 2005-139218 A | 6/2005 |
| JP | 2007-246099 A | 9/2007 |
| JP | 2007-302322 A | 11/2007 |
| JP | 2010-024038 A | 2/2010 |
| WO | 00/59710 A2 | 10/2000 |

OTHER PUBLICATIONS

English translation of JP2002362797.*
English translation of JP61127426.*
Extended European Search Report dated Sep. 11, 2017 from the European Patent Office in counterpart Application No. 15765002.9.
International Search Report dated Jun. 23, 2015 in PCT/JP2015/058085.

* cited by examiner

ADHESIVE SHEET PASTING METHOD AND ADHESIVE SHEET PASTING APPARATUS

CROSS REFERENCE TO RELATED APPLICATIONS

This application is a National Stage of International Application No. PCT/JP2015/058085 filed Mar. 18, 2015, claiming priority based on Japanese Patent Application No. 2014-056587 filed Mar. 19, 2014, the contents of all of which are incorporated herein by reference in their entirety.

TECHNICAL FIELD

This invention relates to a method of pasting adhesive sheets to steel plates of transport machinery including automobiles and various industrial machinery for reinforcement or vibration suppression, and to an adhesive sheet pasting apparatus.

BACKGROUND ART

In recent years, there has been a tendency toward thinner steel plates in order to reduce the weights of vehicles such as automobiles. Such a tendency for thinning is accompanied by a lower rigidity of steel plates. Thinned steel plates are more liable to transmit the unevenness of traveling surfaces, and the vibration and noise of engines. Under the circumstances, proposals have been made to employ resin sheets to compensate for the rigidity of steel plates or resin sheets to damp vibration or the like (see Patent Document 1).

An apparatus has also been proposed for automatically stripping off release paper attached to a reinforcing resin sheet and pasting the sheet to a side member acting as an outer side plate of an automobile body. This apparatus pastes the resin sheet as follows.

First, the release paper is stripped from the resin sheet. That is, a pressure roller provided on an arm of a release paper pressing device is swung down while being pressed on the release paper which is larger than the resin sheet and is projecting from a forward end of a guide member disposed forward of a conveyer belt. The pressure roller at a destination of the descent cooperates with the conveyer belt to hold an end of the release paper. By driving the conveyer belt continuously in this state, the release paper is stripped off while the resin sheet fed from the guide member.

The resin sheet stripped of the release paper is placed on a sheet support disposed forward of the guide member. Pads of a vacuum suction device are pressed on to suck the resin sheet on the sheet support, and transport it to and place it on the side member of the automobile. Then, a cylindrical pressing roller is rolled on the resin sheet to paste it to the side member (see Patent Document 2).

[Patent Document 1]
Unexamined Patent Publication No. 2005-139218
[Patent Document 2]
Unexamined Patent Publication No. 2010-24038

SUMMARY OF INVENTION

Technical Problem

However, the following problem has arisen with the conventional method of pasting an adhesive sheet. The side member acting as an outer side plate of an automobile body has curves or irregularities formed thereon in order to give rigidity to the outer side plate. The resin sheet is thicker than an ordinary adhesive tape. Therefore, when a cylindrical or columnar roller is used, the roller will make contact in a biased way at irregular parts. This gives rise to problem that the resin sheet cannot be applied tight to the outer plate.

This invention has been made having regard to the state of the art noted above, and its principal object is to provide an adhesive sheet pasting method and an adhesive sheet pasting apparatus which can apply an adhesive sheet tight to a steel plate, having curves or irregularities, of transport or other machinery.

Solution to Problem

To fulfill the above object, this invention provides the following construction.

An adhesive sheet pasting method for pasting an adhesive sheet to work, wherein:

in a process of pasting the adhesive sheet to the work while moving a brush roller driven to rotate and the work relative to and crossing each other, a rotating speed of the brush roller is adjusted according to a surface configuration of the work.

According to this method, the brush bristles of the brush roller press on the adhesive sheet while bending to follow the shape of the surface of the work. Therefore, the adhesive sheet can be pasted to an irregular or curved surface of the work by a substantially uniform pressure.

In the above embodiment, it is preferred that the rotating speed of the brush roller is adjusted to be faster than a relative moving speed of the work and the brush roller.

According to this method, the brush bristles slip while bending on the surface of the adhesive sheet. That is, while the pressing per unit area of the adhesive sheet by the brush roller is enlarged, there occurs no stopping of the relative movement between the work and the brush roller. Therefore, the adhesive sheet can reliably be attached tight to the surface of the work.

In the above embodiment, it is preferred that, in the process of pasting the adhesive sheet, a rotational resistance of the brush roller is detected, and a height of the brush roller is adjusted in response to the detection result.

According to this method, the brush roller can be made to follow the surface configuration of the work with high accuracy. As a result, uniform pressure can be applied to the adhesive sheet without stopping rotation of the brush roller.

In each of the above embodiments, the following brush rollers are used.

For example, a brush roller having brush bristles planted in a surface of the roller, in straight lines along a rotary shaft thereof to form a plurality of rows at predetermined intervals.

A brush roller having brush bristles planted in a surface of the roller, in spirals along a rotary shaft thereof to form a plurality of rows at predetermined intervals.

A brush roller having brush bristles planted in a surface of the roller to form an arched top from ends to middle of a rotary shaft thereof. When this brush roller is used, it is preferable to tilt the brush roller according to irregularities on the work surface.

According to this method, the brush bristles can easily be applied in a biased way to edges of ridges on the work surface, or made to follow curved shapes.

To fulfill the above-noted object, this invention provides the following construction.

An adhesive sheet pasting apparatus for pasting an adhesive sheet to work, comprising:

a holding table for holding the work;

a pasting unit for pasting the adhesive sheet to the work while rotating a brush roller;

a drive mechanism for moving the holding table and the brush roller relative to and crossing each other; and a speed controller for adjusting a rotating speed of the brush roller according to a surface configuration of the work to be faster than a relative moving speed of the holding table and the brush roller.

According to this construction, in the process of pasting the adhesive sheet to the work, the rotating speed of the brush roller is adjusted according to the surface configuration of the work to be faster than the moving speed. Thus, the above-noted method can be implemented effectively.

In the above construction, it is preferable to comprise:

a detector for detecting a rotational resistance of the brush roller;

a lift mechanism for vertically moving the brush roller; and a height controller for adjusting a height of the brush roller by operating the lift mechanism in response to a detection result of the detector.

According to this construction, the brush roller is vertically moved according to an irregular configuration of the work surface. Therefore, the pressure acting on the adhesive sheet can be kept substantially constant.

In the above construction, it is preferable to comprise a swing mechanism for tilting the brush roller.

According to this construction, the brush bristles can easily be applied in a biased way to edges of ridges on the work surface, or made to follow curved shapes.

Advantageous Effects of Invention

According to the adhesive sheet pasting method and adhesive sheet pasting apparatus of this invention, the adhesive sheet can be pasted with high accuracy to a surface of work having irregularities.

REFERENCE SIGNS LIST

6 . . . stripping unit
7 . . . holding table
8 . . . pasting mechanism
21 . . . pasting unit
26 . . . holder
27 . . . pasting roller
28 . . . suction pats
41 . . . cylinder
42 . . . swing arm
43 . . . air motor
S . . . adhesive sheet
W . . . work

DESCRIPTION OF EMBODIMENTS

One embodiment of this invention will be described hereinafter with reference to the drawings. This embodiment will be described taking for example a case of pasting an adhesive sheet consists of a reinforcing steel plate resin composition for reinforcing steel plate such as of hoods and doors of automobiles.

<Adhesive Sheet>

Figure 4:
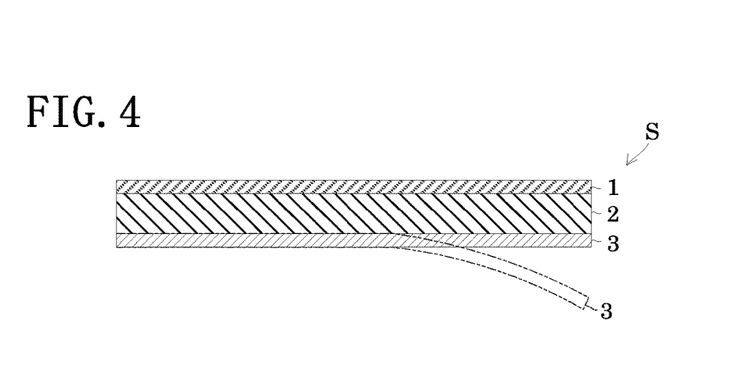
FIG. 4 is a view in vertical section of an adhesive sheet.

As shown in FIG. 4, adhesive sheet S is a sheet of a reinforcing layer 1 with a resin layer 2 laminated thereon. Attached to the opposite face of the resin layer 2 is a separator 3 larger than the shape of the resin layer 2.

The reinforcing layer 1 gives toughness to the resin layer 2 which foams by heating, for example. The reinforcing layer 1 may, for example, be glass cloth, resin glass cloth, synthetic resin nonwoven fabric, metallic foil, or carbon fiber.

<Adhesive Sheet Pasting Apparatus>

Figure 1:
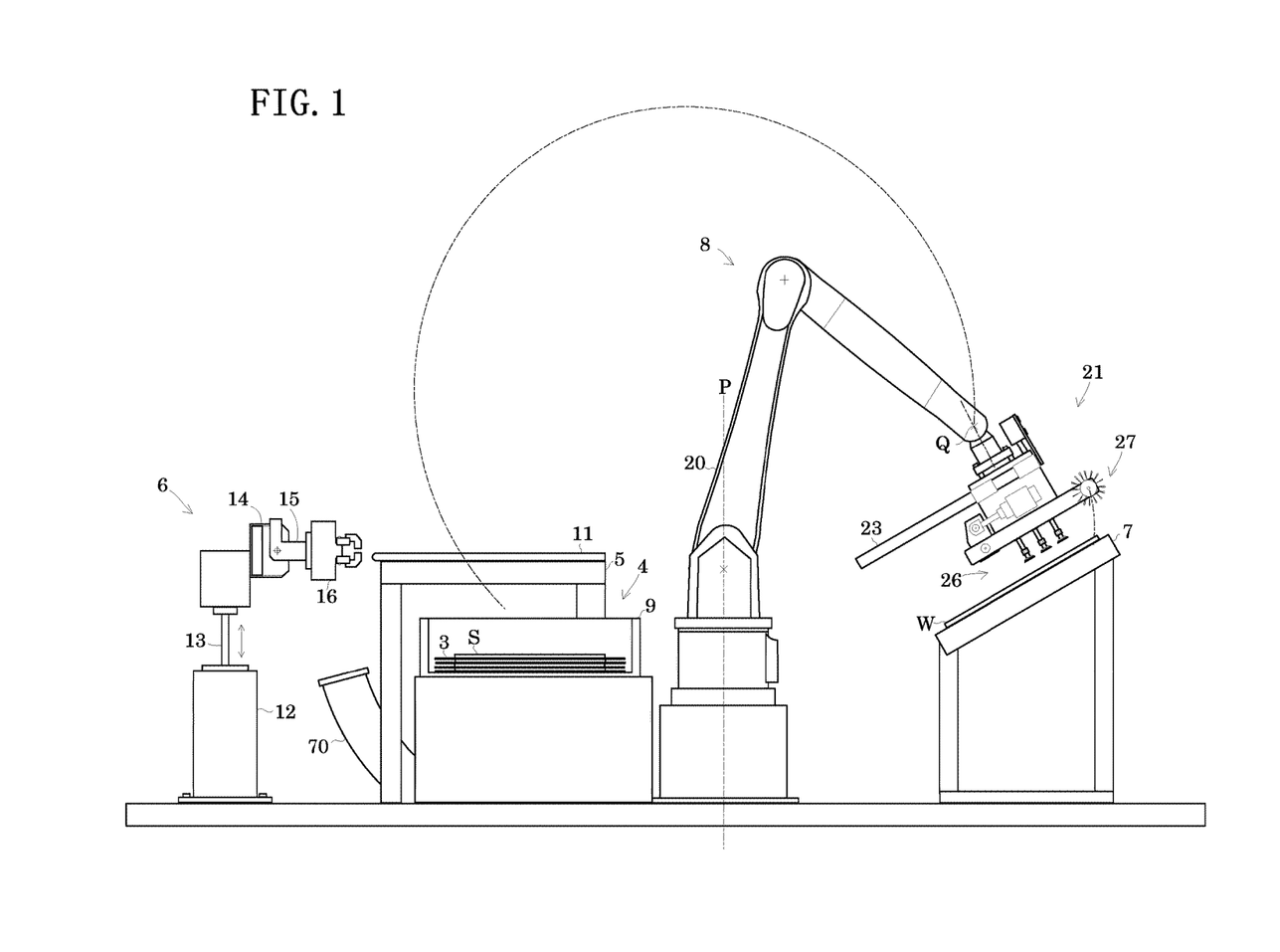
FIG. 1 is a front view of an adhesive sheet pasting apparatus.

FIG. 1 is a front view showing an overall construction of an adhesive sheet pasting apparatus according to one embodiment of this invention.

This pasting apparatus includes a sheet feeding section 4, a stripping table 5, a stripping unit 6, a holding table 7 and a pasting mechanism 8.

The sheet feeding section 4 is constructed to stack and store adhesive sheets S in a stocker 9 installed within a turning radius of movement of a robot 20 to be described hereinafter.

The stripping table 5 has an attachable and detachable support plate 11 mounted thereon. The support plate 11 has a flat surface for holding the entire surface of adhesive sheet S. The support plate 11 has a rounded forward end.

Figure 2:
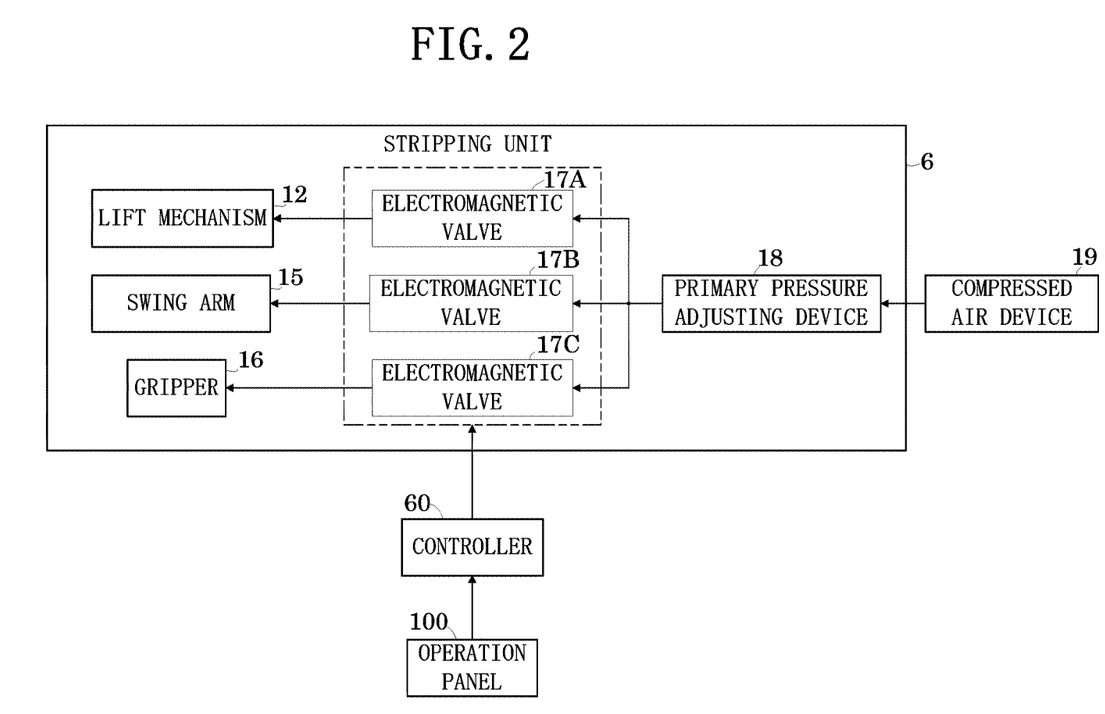
FIG. 2 is a block diagram showing a construction of a stripping unit.

As shown in FIGS. 1 and 2, the stripping unit 6 includes a lift mechanism 12 in form of an air cylinder, a swing arm 15 pivotally supported by a movable block 14 attached to a distal end of a rod 13 of the air cylinder to be movable up and down, and a gripper 16 having a pair of movable pieces 16A and 16B provided at a distal end of the swing arm 15.

The swing arm 15 is constructed to enable adjustment of its swinging, stopping and swing speed by pressure control. The movable pieces 16A and 16B are constructed movable toward and away from each other also by pressure control.

As shown in FIG. 2, the lift mechanism 12, swing arm 15 and gripper 16 are connected respectively through electromagnetic valves 17A, 17B and 17C to a primary pressure adjusting device 18 and a compressed air source 19.

The primary pressure adjusting device 18 makes the pressure of air supplied from the compressed air source 19 into a predetermined stable secondary pressure for output.

The holding table 7 is constructed to hold work W by suction or clamps.

The pasting mechanism 8 includes a transport robot 20, pasting unit 21 and so on.

The robot 20 is constructed swivelable about a vertical axis P, with arms pivotable at each of a plurality of joints. A holding frame 22 is attached to an arm distal end to swivel the pasting unit 21 about an axis Q by means of bearings. The robot 20 corresponds to the transport mechanism in this invention.

The holding frame 22 has a guide rail 23 for allowing reciprocation of a movable block 25, described hereinafter, of the pasting unit 21. A stopper for fall-off prevention is provided at one end of the guide rail 23. Further, a lock mechanism 24 is provided at the other end of the guide rail 22 for engaging and fixing the movable block 10.

Figure 3:
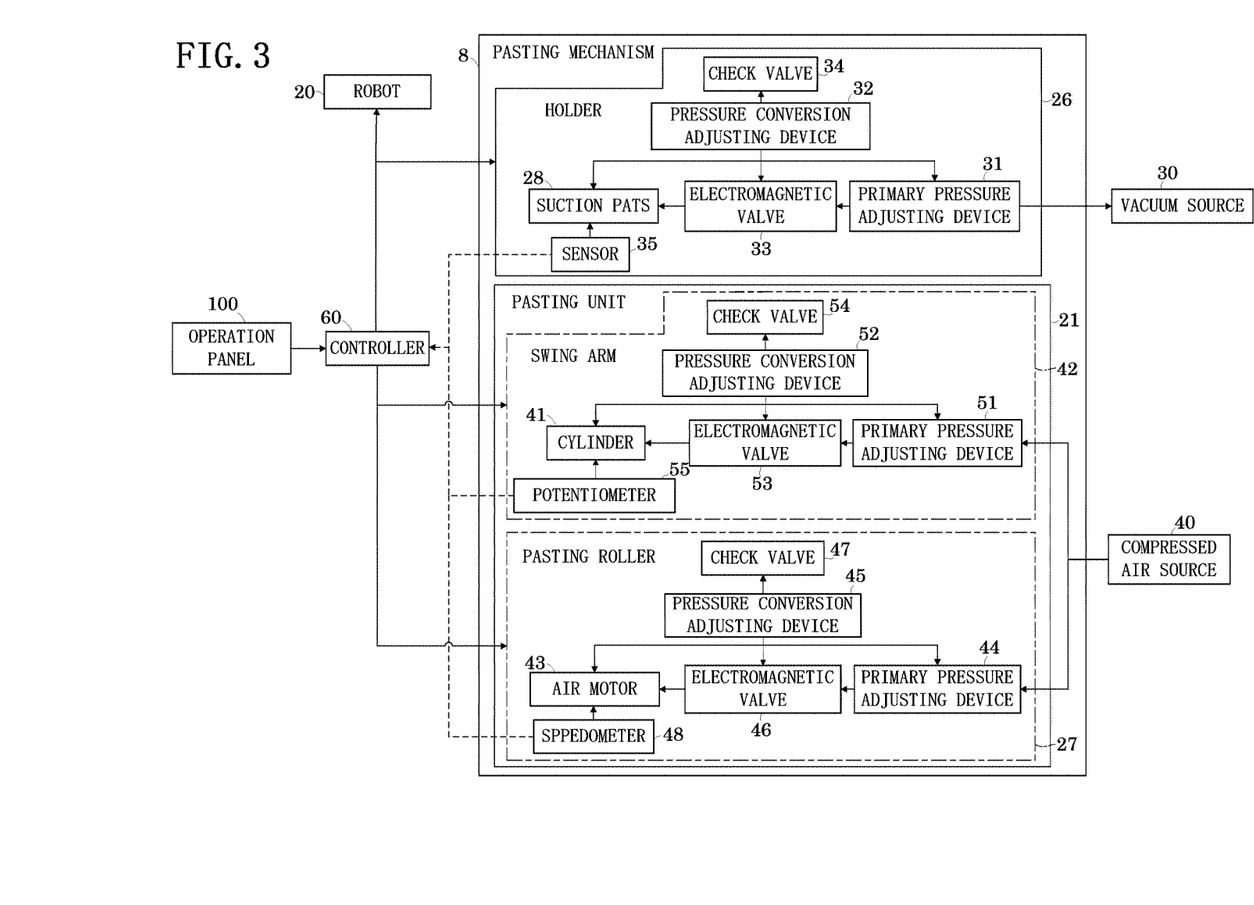
FIG. 3 is a block diagram showing a construction of a pasting unit.

As shown in FIGS. 1 and 3, the pasting unit 21 includes the movable block 25, a holder 26 and a pasting roller 27.

The movable block 25 has the holder 26. The holder 26 has a plurality of suction pats 28 biased downward by elastic elements such as springs. The suction pats 28 are arranged, for example, at a predetermined pitch in a two-dimensional array so that, when the adhesive sheet S is placed on work W, a uniform pressure will act on the adhesive sheet S.

The suction pats 28 have arcuate projections formed on suction surfaces thereof and having coaxial cores. The projections are set to a height fitting in recesses of the suction pats 28. Therefore, the projections prevent the adhesive sheet S from being drawn into the suction pats 28.

The suction pats 28 are connected to an externally connected vacuum source 30, a primary pressure adjusting device 31, a pressure conversion adjusting device 32 and an electromagnetic valve 33 in order from upstream. The pressure conversion adjusting device 32 is equipped with a check valve 34.

The primary pressure adjusting device 31 makes suction by the vacuum source 30 into a stable predetermined secondary pressure for output.

The pressure conversion adjusting device 32 is in form of a regulator, for example, which makes adjustment to maintain a preset secondary pressure (suction) constant. That is, the pressure conversion adjusting device 32, when a sensor 35 detects a variation of suction in the suction pats 28, obtains a difference between an actual pressure in the detection signal and a set reference pressure, and reinstates a set suction by adjusting opening degrees of the electromagnetic valve 33 or check valve 34.

Figure 8:
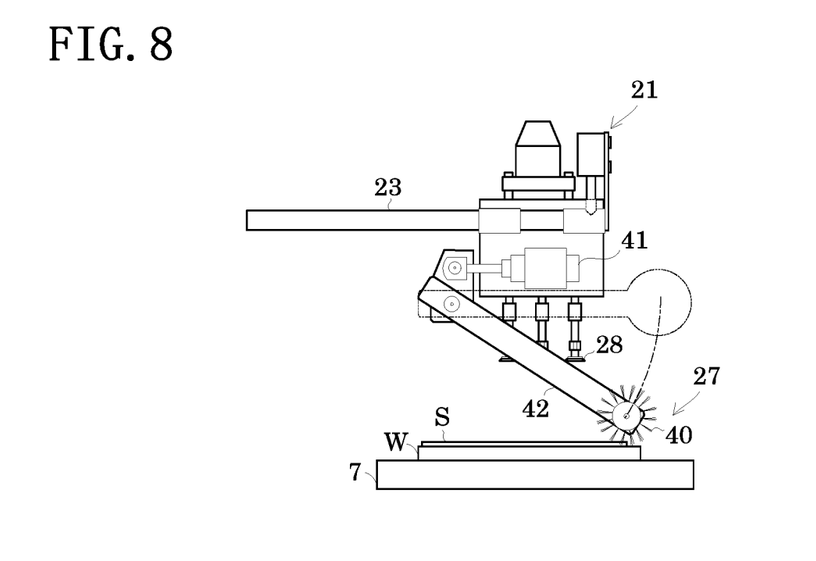
FIG. 8 is a view illustrating operation for pasting the adhesive sheet.
Figure 9:
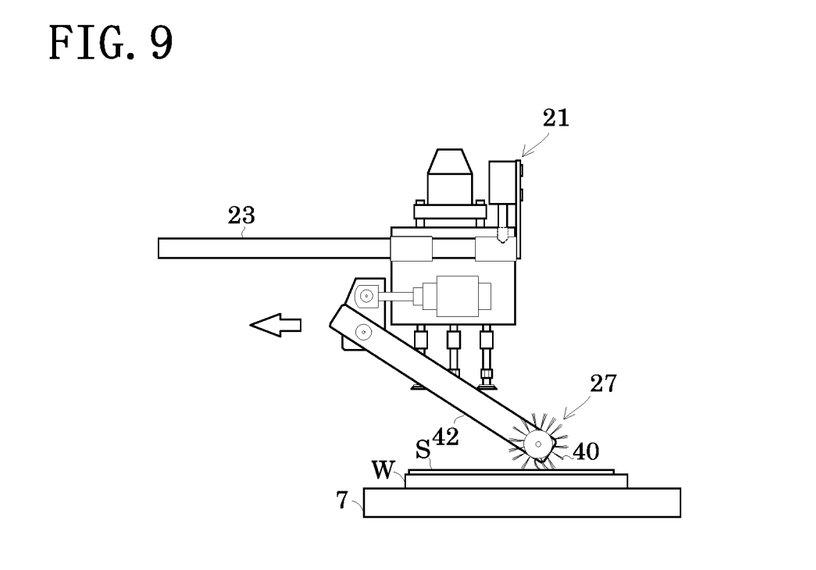
FIG. 9 is a view illustrating operation for pasting the adhesive sheet.

As shown in FIGS. 8 and 9, the pasting roller 27 has brush bristles 40 planted in the surface of a cylindrical roller, in straight lines axially thereof to form a plurality of rows at predetermined intervals. The pasting roller 27 is attached to a distal end of a swing arm 42 connected to a distal end of the rod of a cylinder 41 fixed to the movable block 25. The pasting roller 27 is constructed rotatable, for example, by an air motor 43 acting as driving device. The driving device is not limited to the air motor, but a direct motor, pulse motor or the like can also be used. The pasting roller 20 corresponds to the brush roller in this invention.

The air motor 43 is connected to an externally connected compressed air source 40, a primary pressure adjusting device 44, a pressure conversion adjusting device 45 and an electromagnetic valve 46 in order from upstream. The pressure conversion adjusting device 45 is equipped with a check valve 47.

The pressure conversion adjusting device 45 is in form of a regulator, for example, which makes adjustment to maintain a preset secondary pressure (compressed air) constant. That is, the pressure conversion adjusting device 45 is constructed, with a sensor such as a speedometer 48, for example, measuring variations in rotational frequency of the pasting roller 27, to obtain a difference between a rotating speed derived from the measurement signal and a set reference speed, and maintain the rotating speed constant by adjusting opening degrees of the electromagnetic valve 46 or check valve 47.

The swing arm 42 is connected to the externally connected compressed air source 40, a primary pressure adjusting device 51, a pressure conversion adjusting device 52 and an electromagnetic valve 53 in order from upstream, to enable adjustment of its swinging, stopping and swing speed by cylinder pressure control. The pressure conversion adjusting device 52 is equipped with a check valve 54.

The pressure conversion adjusting device 52 is in form of a regulator, for example, which makes adjustment to maintain a preset secondary pressure constant. That is, the pressure conversion adjusting device 52 is constructed, with a sensor such as a potentiometer 55, for example, detecting variations in rotational resistance acting on the pasting roller 27, to obtain a difference between an actual measured value of the rotational resistance and a set reference value, and maintain the pressure of the pasting roller 27 constant by adjusting opening degrees of the electromagnetic valve 23 or check valve 24 in response to the difference.

Next, a round of operation for pasting the adhesive sheet to the work using the apparatus in the above embodiment will be described based on FIGS. 2 to 9.

First, predetermined conditions are inputted to the controller 60 from an operation panel 100 shown in FIGS. 2 and 3, to set stripping conditions and pasting conditions of the adhesive sheet S.

The stripping conditions require a tensile force which can strip from the adhesive sheet S, without breaking, the separator 3 attached to the adhesive sheet S for use. That is, a stripping speed at which the separator 3 breaks in a process of folding back and strip the separator 3 on the support plate 11 is determined beforehand by experiment or simulation, and a stripping permissible speed is set from this speed to the controller 60. For example, the stripping permissible speed is derived from a lowering speed of the lift mechanism 12 and a swing-down speed of the swing arm 15. The pasting unit 21 having the holder 26 for holding the adhesive sheet S by suction is set to move horizontally at substantially the same speed as the stripping speed. In this embodiment, a setting is made to unlock the lock mechanism 24 of the pasting unit 21 so that the pasting unit 21 may run in a free state along the guide rail 23. In other words, a setting is made so that a downward biasing force due to the weight of the pasting unit 21 and the suction pats 28 may act at the time of stripping the separator S.

Next, hardware configurations such as a height of the gripper 16 of the stripping unit 6 are set. Considering an amount of bending of the adhesive sheet S fed from the support plate 11, for example, a height of the gripper 16 is adjusted so that a forward end portion of the separator 3 attached to the adhesive sheet S may advance between the movable pieces 16A and 16B on standby ahead.

Next, the pasting conditions are set, while moving the pasting unit 21 by operation of the arms of the robot 20, to make the rotating speed of the pasting roller 27 faster than the moving speed for pasting the adhesive sheet S to the work W. Optimal conditions for the pasting speed and the rotating speed are stored beforehand as a recipe in the controller 60, which are obtained through experiments or simulations according to the adhesive sheet S and pasting roller 27 to be used.

An initial setting is made for a pressure of the pasting roller 27 in a pasting start position of the adhesive sheet S to become a predetermined pressure.

When setting of the various initial conditions is completed, the apparatus will be operated. First, the robot 20 moves the pasting unit 21 above the stocker 9. The robot 20 lowers the pasting unit 21 to a predetermined height. The suction pats 28 of the holder 26 hold by suction the adhesive sheet S stored in the stocker 9.

Figure 5:
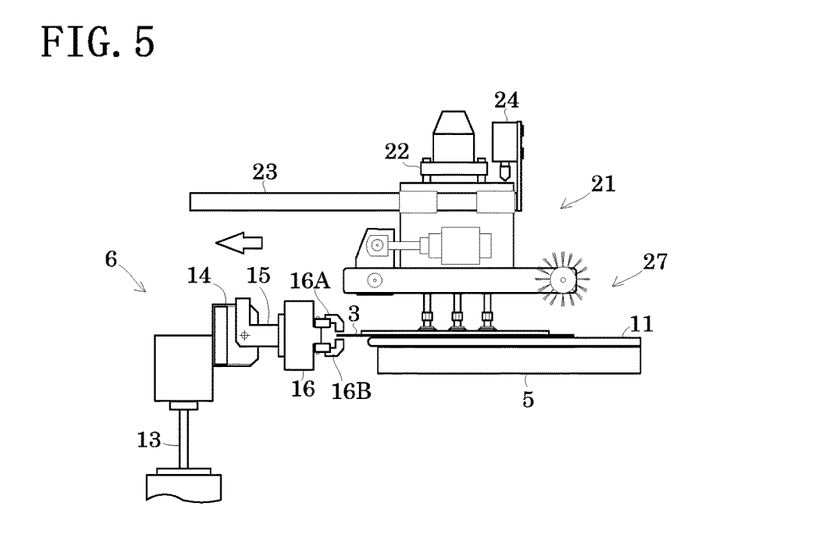
FIG. 5 is a view illustrating operation for pasting the adhesive sheet.

The robot 20 moves the pasting unit 21 suction-holding the adhesive sheet S above the support plate 11, and places the adhesive sheet S thereon. Subsequently, the pasting unit 27, as shown in FIG. 5, slides the adhesive sheet S on the support plate 11 while sucking the adhesive sheet S and applying an appropriate load to the adhesive sheet S by its weight and the elastic biasing of the suction pats 28.

When the adhesive sheet S projects from the forward end of the support plate 11, the forward end portion of the separator 3 advances between the movable pieces 16A and 16B standing by in an open state ahead.

Figure 6:
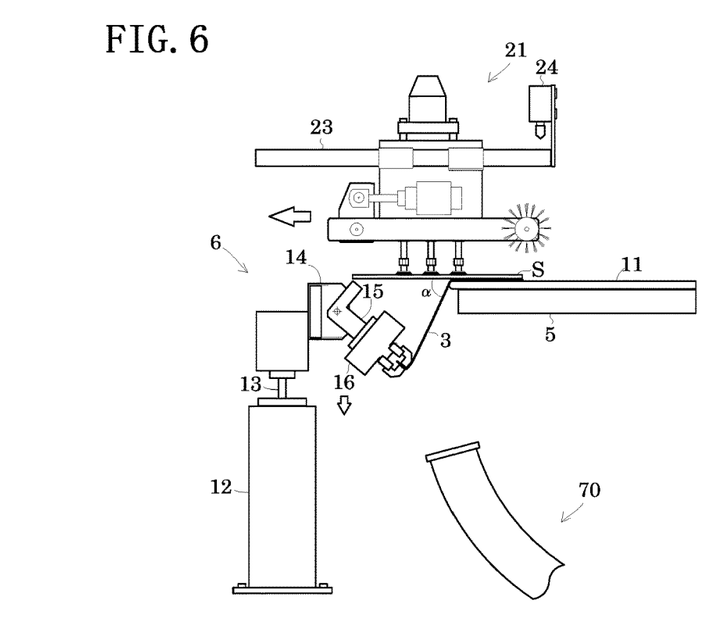
FIG. 6 is a view illustrating operation for pasting the adhesive sheet.
Figure 7:
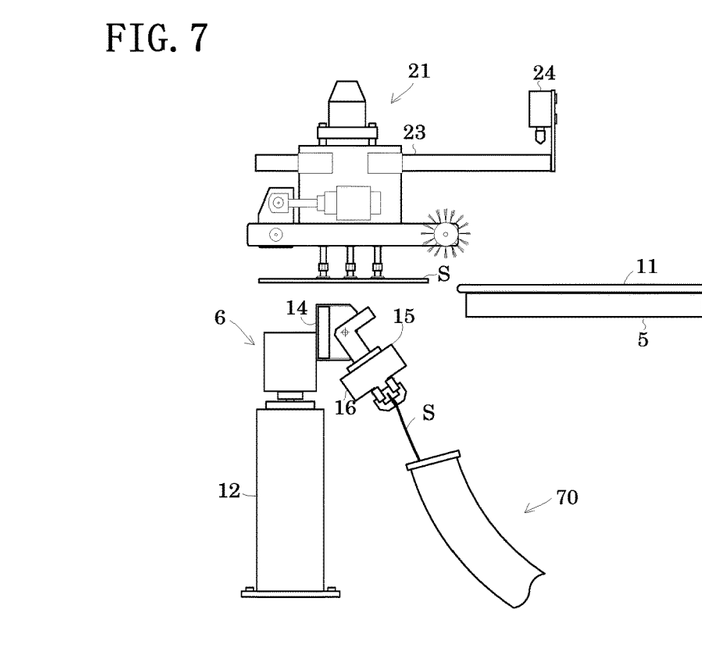
FIG. 7 is a view illustrating operation for pasting the adhesive sheet.

When the separator 3 reaches a predetermined position, as shown in FIG. 6, the movable pieces 16A and 16B are closed to grip the forward end portion of the separator 3, and as shown in FIG. 7, the swing arm 15 is swung down while the lift mechanism 12 is lowered. By lowering the swing arm 15 in a direction crossing the adhesive sheet S transported horizontally, the separator 3 is stripped off as it is turned down at the forward end of the support plate 11. At this time, angle α formed by the separator 3 turned down relative to a longitudinal horizontal axis of the adhesive sheet S is maintained at an acute angle.

Synchronously with this operation for stripping the separator 3, the pasting unit 21 moves horizontally while holding the adhesive sheet S by suction.

The separator 3 stripped from the adhesive sheet S is collected by a suction device 70 disposed below the swing arm 15.

The robot 20 moves to the holding table 7 with the holder 26 of the pasting unit 21 holding the adhesive sheet S by suction. In this moving process, the pasting unit 21 is turned into a tilting position to slide on the guide rail 23. That is, the movable block 25 of the pasting unit 21 having moved to the end of the guide rail 23 is fixed by the lock mechanism 24.

When the pasting unit 21 reaches a predetermined position of the work W on the holding table 7, the robot 20 lowers the pasting unit 21 to place the adhesive sheet S suction-supported by the suction pats 28 on the work W.

The robot 20 moves the pasting unit 21 to a position where the suction pats 28 having its suction turned off do not contact the adhesive sheet S. Subsequently, the controller 60 operates the swing arm 41 through the cylinder 41, as shown in FIG. 8, to lower the pasting roller 27 to a pasting position. At the same time, the pasting roller 27 is rotated.

When the pasting roller 27 reaches the pasting position, as shown in FIG. 9, the robot 20 moves the pasting unit 21 so that the pasting roller 27 will cross the work W. At this time, the pasting roller 27 presses the adhesive sheet S to paste it to the work W while rotating at a faster speed than a moving speed.

In this pasting process, the rotational resistance acting on the pasting roller 27 is detected by the potentiometer 55. The controller 70 compares an actual measured value and the reference value of the rotational resistance, and in response to a difference obtained, carries out controls to adjust the height of the pasting roller 27 by changing a swing angle of the swing arm 42 by means of the cylinder 41, thereby to render constant the pressure applied from the pasting roller 27 to the adhesive sheet S.

Further, the controller 60 monitors the rotating speed of the pasting roller 27 by means of the speedometer 48, and carries out control to keep the rotating speed constant.

When the pasting roller 27 reaches a terminal position, the controller 60 stops rotation of the pasting roller 27 and operates the robot 20 to paste the adhesive sheet S to next work W. At the same time, the work W to which the adhesive sheet S has been pasted is unloaded from the holding table 7. This completes the round of operation for pasting the adhesive sheet to the work W, and the same operation is repeated thereafter.

According to the apparatus in the above embodiment, the brush bristles forming a plurality of rows at predetermined intervals on the surface of the pasting roller 27 follow the work surface while bending on the surface of the adhesive sheet S, and while slipping, press the same location a plurality of times. That is, the pressing per unit area of the adhesive sheet S by the pasting roller 27 can be increased. Further, since the rotational resistance of the pasting roller 27 is detected for height adjustment, there occurs no stopping of the rotation of the pasting roller 27. Therefore, since the adhesive sheet S can be pasted to the work W while applying a substantially uniform pressure to the entire work surface, the adhesive sheet S can reliably be attached tight to the surface of work W.

This invention can also be implemented in the following modes:

(1) In the apparatus in the above embodiment, the pasting unit 21 is not limited to the form attached to the robot 20. It may for example be a construction attached to a distal end of a lift mechanism supported by suspension to run along a guide rail provided on a ceiling. The holding table 7 holding work W is therefore not limited to having a sloping support surface, but may be horizontal.

The pasting unit 21 may be arranged stationary, with the holding table 7 made movable.

Figure 10:
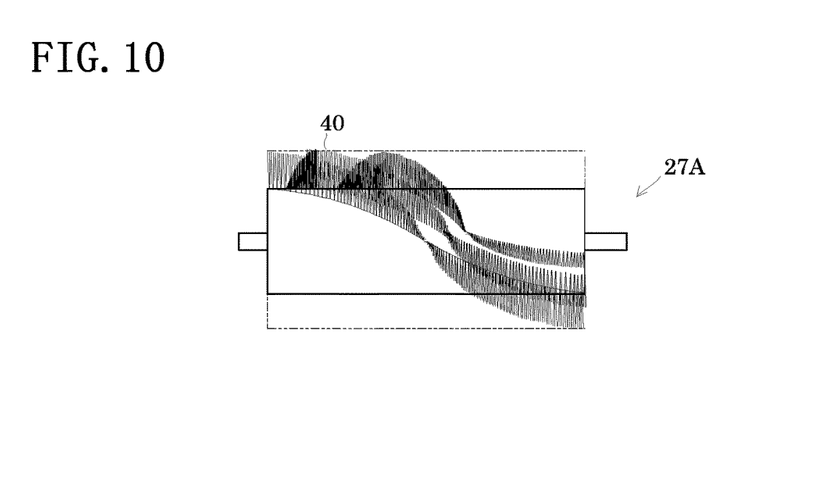
FIG. 10 is a front view of a modified pasting roller.
Figure 11:
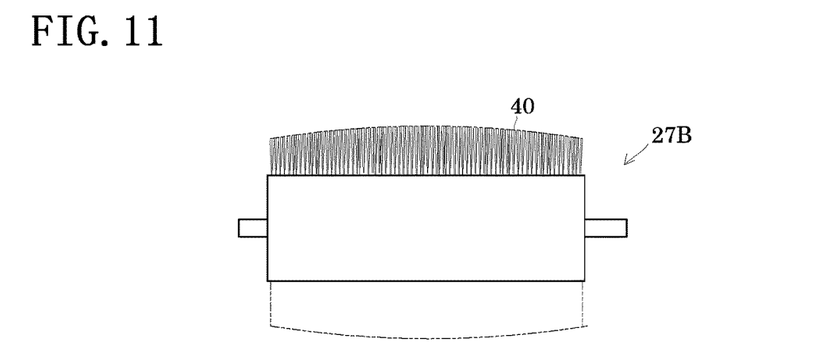
FIG. 11 is a front view of a modified pasting roller.

(2) The pasting roller 27 in the above embodiment, as shown in FIG. 10, may have brush bristles 40 planted in the roller surface in a spiral manner to form a plurality of rows at predetermined intervals on the surface. Alternatively, the pasting roller 27, as shown in FIG. 11, may have brush bristles 40 increasing in length from opposite ends toward the middle of its rotary shaft.

Where the pasting roller 27A with the brush bristles 40 planted spirally is used, a more uniform pressure can be applied than the pasting roller 27 with the brush bristles 40 planted directly. That is, where the pasting roller 27 with the brush bristles 40 in straight lines is used, when the brush bristles are in contact with the work W and then a next row of brush bristles comes into contact with the work W, the brush bristles 40 will intermittently collide with the work W depending on a pitch between the rows. In other words, a shock will be applied lightly to the adhesive sheet S.

On the other hand, where the pasting roller 27B with the spiral brush bristles 40 is used, the brush bristles 40 press on the adhesive sheet S while continuously bending along the spirals. Therefore, a uniform pressure acts constantly on the adhesive sheet S.

Where the pasting roller 27B planted with brush bristles having different lengths is used, the pasting roller 27B may be rolled obliquely relative to the surface of work W. That is, when the surface of work W is curved, for example, the pressure acting on the adhesive sheet S can be kept substantially constant by using a curvature substantially the same as that curvature. When the work W has a surface with irregularities, the adhesive sheet S can be attached tight to edges of the irregularities by applying the brush bristles in a biased way according to shapes of the irregularities.

(3) In the apparatus in the above embodiment, the height adjustment of the pasting roller 27 is not limited to the above-described mode. For example, mapping data of a surface configuration of work W may be acquired beforehand, and the height of the pasting roller 27 may be adjusted based on position information of the mapping data and position information on the pasting roller 27 in movement.

INDUSTRIAL UTILITY

As described above, this invention is suitable for pasting adhesive sheet with high accuracy to a surface of work having irregularities.

The invention claimed is:

1. An adhesive sheet pasting method for pasting an adhesive sheet to work, wherein:
   in a process of pasting the adhesive sheet to the work while moving a brush roller driven to rotate and the work relative to and crossing each other, a rotating speed of the brush roller is adjusted according to a surface configuration of the work, and
   wherein, in the process of pasting the adhesive sheet, a rotational resistance of the brush roller is detected, and a height of the brush roller is adjusted in response to the detection result.

2. The adhesive sheet pasting method according to claim 1, wherein the rotating speed of the brush roller is adjusted to be faster than a relative moving speed of the work and the brush roller.

3. The adhesive sheet pasting method according to claim 1, wherein the brush roller has brush bristles planted in a surface of the roller, in straight lines along a rotary shaft thereof to form a plurality of rows at predetermined intervals.

4. The adhesive sheet pasting method according to claim 1, wherein the brush roller has brush bristles planted in a surface of the roller, in spirals along a rotary shaft thereof to form a plurality of rows at predetermined intervals.

5. The adhesive sheet pasting method according to claim 1, wherein:
   the brush roller has brush bristles planted in a surface of the roller to form an arched top from ends to middle of a rotary shaft thereof; and
   the brush roller is tilted according to an unevenness of the work surface.

* * * * *